United States Patent
Ueda et al.

(10) Patent No.: US 8,247,082 B2
(45) Date of Patent: Aug. 21, 2012

(54) ALUMINUM ALLOY BRAZING SHEET

(75) Inventors: Toshiki Ueda, Moka (JP); Shimpei Kimura, Moka (JP); Takahiro Izumi, Moka (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 13/037,543

(22) Filed: Mar. 1, 2011

(65) Prior Publication Data
US 2011/0236717 A1    Sep. 29, 2011

(30) Foreign Application Priority Data
Mar. 29, 2010    (JP) ................. 2010-074027

(51) Int. Cl.
*B32B 15/20* (2006.01)
*F28F 21/08* (2006.01)
(52) U.S. Cl. .... 428/654; 165/905; 148/535; 228/262.51
(58) Field of Classification Search ............... None
See application file for complete search history.

(56) References Cited

U.S. PATENT DOCUMENTS

| | | | |
|---|---|---|---|
| 5,037,707 A * | 8/1991 | Fortin et al. ............ | 428/654 |
| 6,019,939 A * | 2/2000 | Gray et al. ............. | 420/528 |
| 7,387,844 B2 | 6/2008 | Ueda et al. | |
| 2006/0134451 A1 | 6/2006 | Saisho et al. | |
| 2007/0113936 A1* | 5/2007 | Oki et al. ............. | 148/551 |
| 2007/0166565 A1* | 7/2007 | Fukumoto et al. ........ | 428/654 |
| 2007/0246509 A1 | 10/2007 | Koshigoe et al. | |
| 2009/0020276 A1 | 1/2009 | Ueda et al. | |
| 2009/0165901 A1 | 7/2009 | Koshigoe et al. | |
| 2010/0101688 A1 | 4/2010 | Koshigoe et al. | |
| 2010/0112370 A1 | 5/2010 | Ueda et al. | |
| 2010/0183897 A1 | 7/2010 | Kobayashi et al. | |
| 2011/0014494 A1 | 1/2011 | Matsumoto et al. | |
| 2011/0240280 A1 | 10/2011 | Izumi et al. | |
| 2011/0287276 A1 | 11/2011 | Izumi et al. | |
| 2011/0287277 A1 | 11/2011 | Kimura et al. | |

FOREIGN PATENT DOCUMENTS

| | | | |
|---|---|---|---|
| JP | 08246117 A | * | 9/1996 |
| JP | 11-241136 | | 9/1999 |
| JP | 2002-273598 | | 9/2002 |
| JP | 2005-15857 | | 1/2005 |
| JP | 2007-131872 | | 5/2007 |

OTHER PUBLICATIONS

JP 08-246117 (JPO Machine Translation).*

* cited by examiner

*Primary Examiner* — John J Zimmerman
(74) *Attorney, Agent, or Firm* — Oblon, Spivak, McClelland, Maier & Neustadt, L.L.P.

(57) ABSTRACT

There is provided an aluminum alloy brazing sheet having an improved brazability than in the related art while keeping the post-braze strength, workability, corrosion resistance, and the like at respective prescribed or higher levels. An aluminum alloy brazing sheet has a two-layered structure in which on one side of a core material, a brazing material is provided. The core material contains Si: 0.6 to 1.0 mass %, Cu: 0.6 to 1.0 mass %, Mn: 0.7 to 1.8 mass %, Mg: 0.1 to 0.7 mass %, and Ti: 0.06 to 0.20 mass %, and the balance including Al and inevitable impurities. The brazing material includes an aluminum alloy containing Si: 3.0 to 12.0 mass %, the gage of the aluminum alloy brazing sheet is 0.6 to 1.4 mm, and the area ratio of a {001} plane in the core material surface is 0.3 or more.

15 Claims, 2 Drawing Sheets

FIG.3 ized form. Further, braz-
ALUMINUM ALLOY BRAZING SHEET

BACKGROUND OF THE INVENTION

1. Field of the Invention

The present invention relates to an aluminum alloy brazing sheet excellent in brazability, for use in a heat exchanger of an automobile or the like.

2. Background Art

Conventionally, the side support member (reinforcing material) for use in a radiator or a heater core of a heat exchanger for an automobile, or the like is often in a two-layered structure including a core material and a brazing material (e.g., JP-A No. 11-241136 (see, paragraph 0020)). To the core material, Mg is added in an amount of about 0.2 mass %, and further, the gage is set at a prescribed or larger thickness to achieve a higher strength (see, e.g., JP-A No. 2007-131872 (see, paragraph 0010)).

On the other hand, with a recent trend toward light-weight automobiles, there has been an increasing demand for gauge down of the side support member. However, for example, when the side support member to which the technology in accordance with JP-A No. 11-241136 (see, paragraph 0020) or JP-A No. 2007-131872 (see, paragraph 0010) is applied is thinned as it is, it may be impossible to ensure the sufficient strength as a heat exchanger. Further, in order to ensure a further strength, it can also be considered that the amount of Mg to be added in the core material is increased. However, generally, it is known that Mg reduces the wettability of the brazing filler metal, and adversely affects the brazability.

Figure 3:
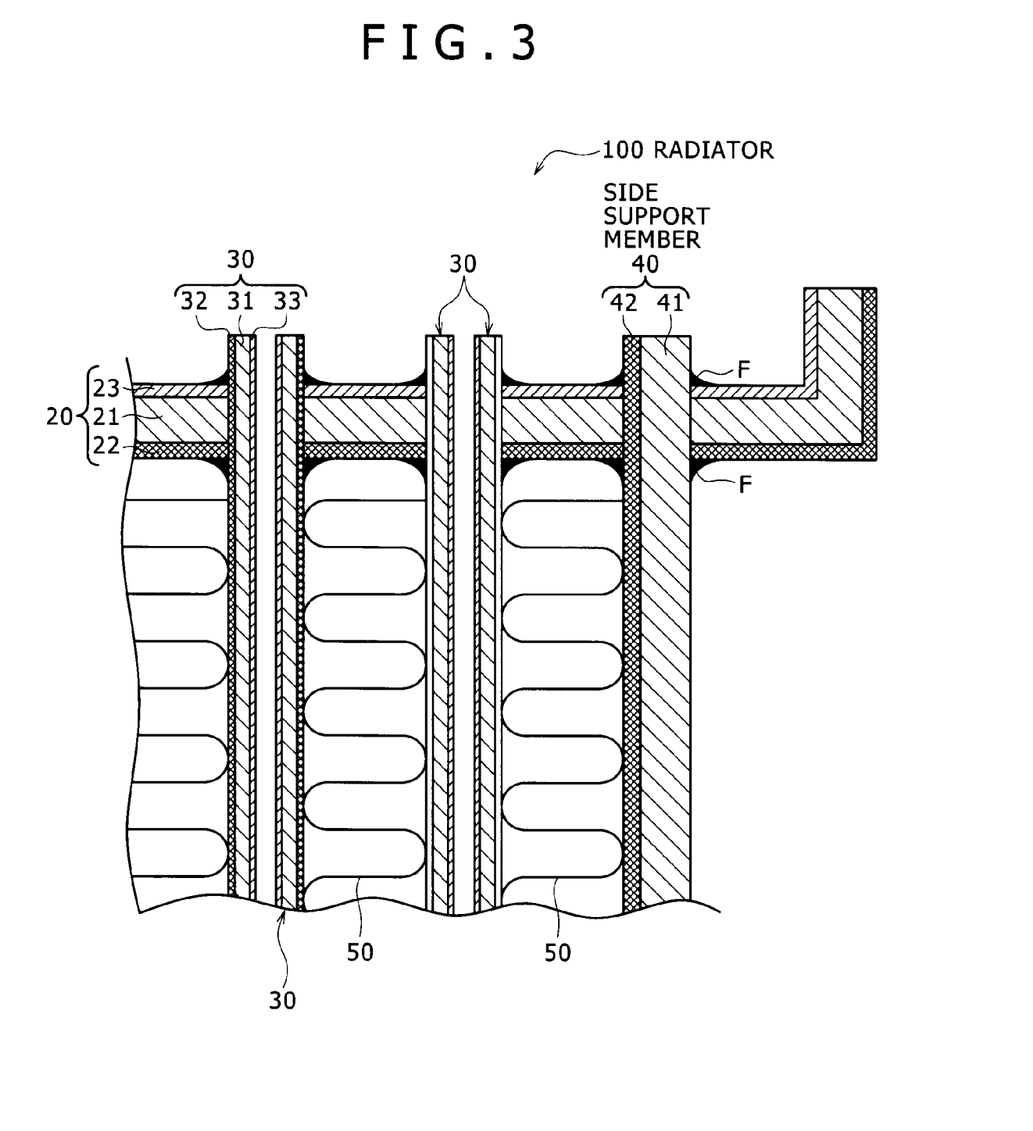
FIG. 3 is a cross-sectional view illustrating a structure of a radiator of a general heat exchanger.

Herein, the radiator of a general heat exchanger has the cross-sectional shape as illustrated in FIG. 3. Namely, a radiator 100 has a structure in which between tubes 30 for passing a refrigerant therethrough and side support members 40 for reinforcement, fins 50 are disposed, respectively, and header plates 20 are respectively attached to the opposite ends of the tubes 30 and the side support members 40. Incidentally, in FIG. 3, the length, thickness, width, and the like of each member are illustrated in an exaggerated form. Further, brazing materials 22, 32, and 42 are generally melted by heating during brazing, but are left and illustrated for convenience of description.

The side support member 40 of such a radiator 100 is generally formed by using a brazing sheet of a two-layered structure in which on one side of a core material 41, the brazing material 42 is disposed (in FIG. 3, the brazing sheet has been brazed, but the brazing material 42 is left and illustrated for convenience of description). Accordingly, the core material 41 is directly brazed to the header plate 20 at some sites. Therefore, the brazing material 22 of the header plate 20 which is another member is spread over the surface of the core material 41 by heating for brazing, resulting in formation of fillets F (portions of the brazing filler metal protruding out of the clearances of the joints).

Thus, when the core material 41 of the side support member 40 required to be brazed to other members contains Mg for ensuring the strength as described above, Mg directly reacts with the flux during braze heating, so that high-melting-point compounds such as $MgF_2$ become more likely to be formed. Then, as a result, the oxide film breaking action due to the flux is reduced, which inhibits the wettability of the brazing filler metal. This results in reduction of the brazability.

Under such circumstances, conventionally, in order to avoid such a problem, an intermediate layer is provided between the core material and the brazing material, thereby to ensure the strength without increasing the amount of Mg added (e.g., JP-A No. 2005-015857 (see, paragraph 0022)); alternatively, on the other side of the core material (the surface opposite to the surface on which the brazing material is provided), a layer not containing Mg is provided, thereby to improve the brazability (e.g., JP-A No. 2002-273598 (see, paragraph 0020)).

However, with each method described in JP-A No. 2005-015857 (see, paragraph 0022) and JP-A No. 2002-273598 (see, paragraph 0020), other than the core material and the brazing material, another layer is provided. This unfavorably results in an increase in manufacturing cost. Further, with only such means as described in JP-A No. 2005-015857 (see, paragraph 0022) and JP-A No. 2002-273598 (see, paragraph 0020), the improvement of the brazability is insufficient.

SUMMARY OF THE INVENTION

The present invention was completed in view of such circumstances. It is an object of the present invention to provide an aluminum alloy brazing sheet having an improved brazability than those in the related art while keeping the post-braze strength, workability, corrosion resistance, and the like at respective prescribed or higher levels.

The present inventors conducted close experiments and study on whether there are other factors for improving the brazability than provision of additional layers other than the core material and the brazing material. Then, the present inventors found the following: the crystal orientation (area ratio of {001} plane) of the core material surface has correlation with the brazability; and control of the crystal orientation improves the brazability.

Namely, in order to solve the foregoing problems, an aluminum alloy brazing sheet in accordance with the present invention is an aluminum alloy brazing sheet of a two-layered structure, including: a core material; and a brazing material provided on one side of the core material. The core material contains Si: 0.6 to 1.0 mass %, Cu: 0.6 to 1.0 mass %, Mn: 0.7 to 1.8 mass %, Mg: 0.1 to 0.7 mass %, and Ti: 0.06 to 0.20 mass %, and the balance including Al and inevitable impurities. The brazing material includes an aluminum alloy containing Si: 3.0 to 12.0 mass %. The gage of the aluminum alloy brazing sheet is 0.6 to 1.4 mm. The area ratio of a {001} plane in the core material surface is 0.3 or more.

With such a configuration, for the aluminum alloy brazing sheet, by allowing the core material to contain prescribed amounts of Si, Cu, Mn, and Mg, the strength and the formability can be improved. In addition, by allowing the core material to contain a prescribed amount of Ti, the corrosion resistance can be improved. Further, by setting the gage within the prescribed range, gauge down can be achieved while keeping the strength. Still further, by setting the area ratio of the {001} plane in the core material surface at a prescribed or higher value, the surface energy of the core material can be increased, which can improve the wettability of the brazing filler metal.

Further, in the aluminum alloy brazing sheet in accordance with the present invention, the core material further contains at least one of Cr: 0.02 to 0.25 mass % and Zr: 0.02 to 0.25 mass %.

With such a configuration, for the aluminum alloy brazing sheet, by allowing the core material to contain any of Cr or Zr in a prescribed amount, the strength and the formability can be further improved.

With the aluminum alloy brazing sheet in accordance with the present invention, by setting the area ratio of the {001} plane in the core material surface at 0.3 or more, the surface energy of the core material is increased, resulting in improved wettability of the brazing filler metal of the core material. Therefore, even when the oxide film breaking action of the flux is deteriorated by including Mg in the core material, the brazability of the core material can be improved.

DESCRIPTION OF THE PREFERRED EMBODIMENTS

Figure 1:
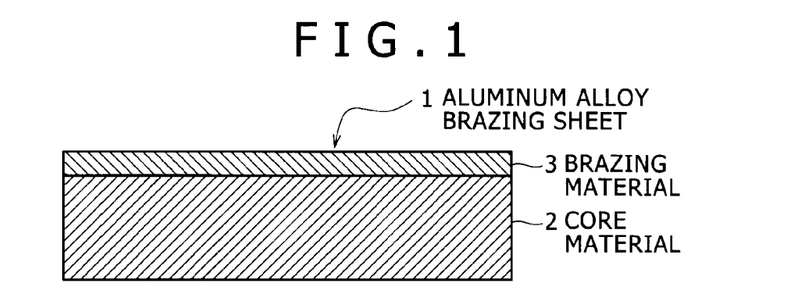
FIG. 1 is a cross-sectional view illustrating an aluminum alloy brazing sheet in accordance with Embodiment.

Below, a brazing sheet in accordance with Embodiment of the present invention will be described in details. As illustrated in FIG. 1, a brazing sheet 1 in accordance with Embodiment has a two-layered structure in which a brazing material 3 is cladded on one side of a core material 2. When such a brazing sheet 1 is used as the side support member of the radiator as described above, it is directly brazed to a header plate which is another member.

The brazing sheet 1 in accordance with Embodiment has the following feature: the composition of the core material 2 is optimized, and the finish cold rolling ratio and the finish annealing conditions during manufacturing are controlled; as a result, the area ratio of the {001} plane in the core material 2 surface is controlled at a prescribed or higher value to improve the brazability. Below, first, the relationship between the area ratio of the {001} plane and the brazability will be described in order from the principle.

(Area Ratio of {001} Plane)

The {001} plane denotes, in the crystal lattice planes of the core material 2 surface, the planes in parallel with the length (rolling) direction, the width direction, and the thickness direction of the brazing sheet 1 expressed in Miller indices. Namely, as illustrated in FIG. 2, a {001} plane 10 is a comprehensive expression of the Miller indices illustrating any of a (001) plane 11, a (010) plane 12, a (100) plane 13, a (00-1) plane 14, a (0-10) plane 15, and a (-100) plane 16 of the crystal lattice planes illustrated in FIG. 2.

Figure 2:
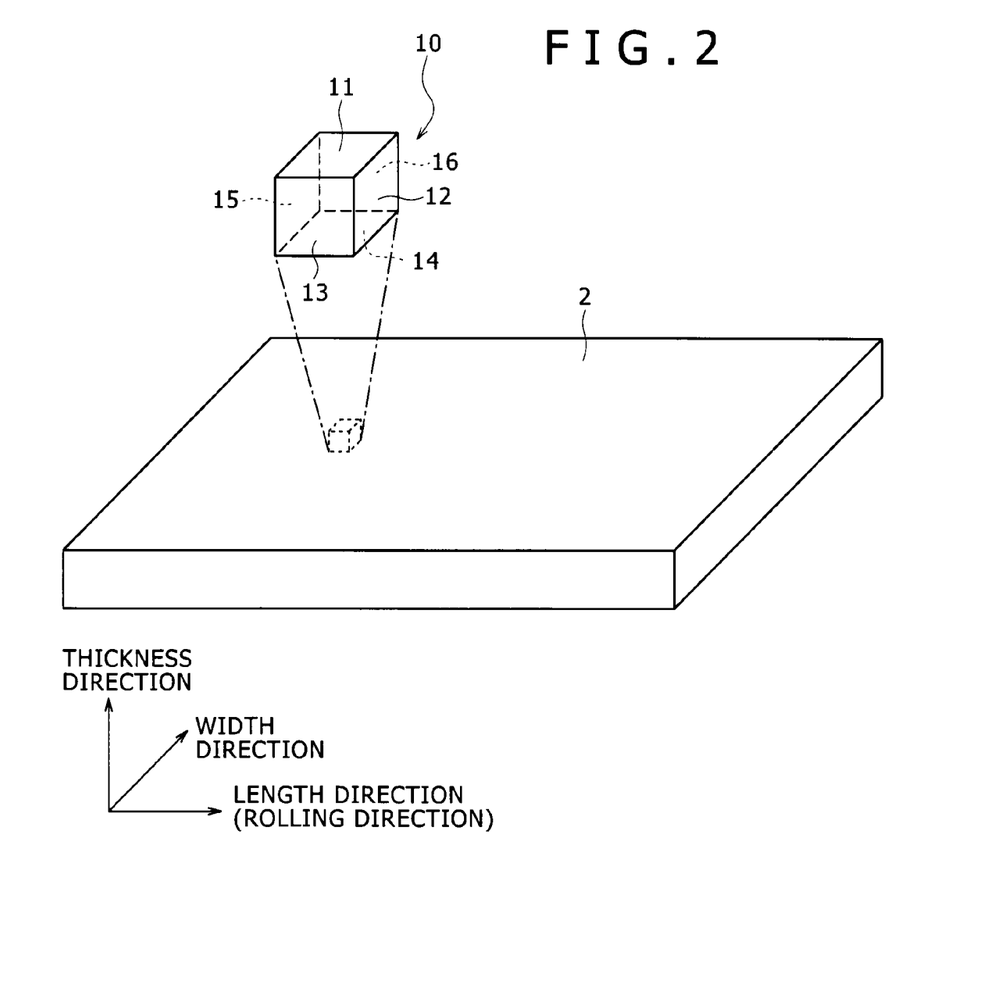
FIG. 2 is a schematic view for illustrating the crystal lattice plane of the core material surface in an aluminum alloy brazing sheet material in accordance with Embodiment.

Herein, as illustrated in FIG. 2, the (001) plane 11 and the (00-1) plane 14 opposite thereto mean a crystal lattice plane in parallel with the length direction and the width direction of the brazing sheet 1; the (010) plane 12 and the (0-10) plane 15 opposite thereto mean a crystal lattice plane in parallel with the width direction and the thickness direction of the brazing sheet 1; and the (100) plane 13 and the (-100) plane 16 opposite thereto mean a crystal lattice plane in parallel with the length direction and the thickness direction of the brazing sheet 1.

The area ratio of the {001} plane 10 means the ratio of the {001} plane 10 to the crystal lattice planes of the core material 2 surface. Namely, the area ratio of the {001} plane means the ratio of crystal grains having crystal orientations in parallel with the length direction, width direction, and thickness direction of the brazing sheet 1 out of the crystal grains present in the core material 2 surface. Incidentally, the core material 2 surface denotes, as described later, the portion 40 to 90 μm advancing from the outermost surface in the gage (inside) direction of the core material 2. A specific measurement method of the area ratio of the {001} plane 10 in the core material 2 will be described later.

(Relationship Between Area Ratio of {001} Plane and Intermetallic Compound)

The area ratio of the {001} plane 10 in the core material 2 surface is affected by the amount of intermetallic compounds with a given or larger size such as a size of 1 μm or larger included in the surface of the core material 2. For example, when a large number of 1-μm or larger intermetallic compounds are present in the surface of the core material 2, recrystallization and crystal grain growth are promoted with the intermetallic compounds as nuclei during brazing (heating). Then, a large number of crystal grains having different crystal orientations grow, resulting in reduction of the area ratio of the {001} plane 10 in the core material 2 surface.

On the other hand, the composition of the core material 2, and the finish cold rolling ratio and finish annealing conditions during manufacturing are optimized so as to prevent crystallization of intermetallic compounds with a given or larger size in the core material 2 surface. As a result, it is possible to inhibit the recrystallization and the growth of crystal grains, and to prevent the growth of crystal grains with different crystal orientations. Namely, the optimization results in an increase in area ratio of the {001} plane 10 in the core material 2 surface.

(Relationship Between Area Ratio of {001} Plane and Surface Energy)

When the area ratio of the {001} plane 10 in the core material 2 surface is high, the surface energy (energy necessary for forming another unit-area surface in liquid or solid) of the core material 2 also increases. Although not revealed in details, this is considered to be due to the following reason: an increase in area ratio of the {001} plane 10 results in a decrease in area ratio of planes, other than the {001} plane 10, with a smaller surface energy than that of the {001} plane 10; this leads to a relative increase in surface energy. Therefore, as described above, by inhibiting the crystallization of intermetallic compounds in the core material 2 surface, and controlling the area ratio of the {001} plane 10 in the core material 2 surface, it is possible to increase the surface energy of the core material 2.

(Relationship Between Surface Energy and Wettability of Brazing Filler Metal)

When the surface energy of the core material 2 increases, the wettability of the brazing filler metal in the core material 2 surface also increases. This can be explained from the Young's equation expressed as the following equation (1) defining the relationship between the solid-liquid interface energy and the contact angle. Incidentally, in the equation (1), $\gamma_s$ represents the surface energy of the solid (core material 2); $\gamma_l$, the surface energy of the liquid (brazing material 3); θ, the contact angle (the angle formed between the tangent to the brazing material 3 and the core material 2 surface); and $\gamma_{s1}$, the solid-liquid interface energy.

[Mathematical Expression 1]

$$\cos\theta = (\gamma_s - \gamma_{s1})/\gamma_l \quad (1)$$

In the present embodiment, by optimizing the composition of the core material 2, and controlling the finish cold rolling ratio and the finish annealing conditions, the surface energy $\gamma_s$ of the solid of the equation (1) is increased. On the other hand, the surface energy $\gamma_l$ of the liquid of the equation (1) does not change, and the solid-liquid interface energy $\gamma_{s1}$ also does not change largely. Therefore, an increase in surface energy $\gamma_s$ of the solid necessarily results in an increase in value of cos θ. Namely, the value of cos θ approaches 1 (cos 0°), and the value of the contact angle θ itself becomes smaller.

Herein, in general, the smaller the contact angle θ of liquid to solid is, the higher the wettability of liquid to solid is. Therefore, as described above, when the area ratio of the {001} plane 10 in the core material 2 surface increases, the wettability of the brazing filler metal to the core material 2 surface is also improved. Further, a higher wettability of the brazing filler metal necessarily results in a higher brazability with other members.

Below, on the basis of the explanation, respective elements forming the brazing sheet 1 in accordance with Embodiment will be described in details.

(Core Material)

The core material 2 includes Si: 0.6 to 1.0 mass %, Cu: 0.6 to 1.0 mass %, Mn: 0.7 to 1.8 mass %, Mg: 0.1 to 0.7 mass %, and Ti: 0.06 to 0.20 mass %, and the balance including Al and inevitable impurities. Further, the core material 2 preferably further includes at least one of Cr: 0.02 to 0.25 mass %, and Zr: 0.02 to 0.25 mass %. Below, the reason for restriction will be described.

(Si: 0.6 to 1.0 Mass %)

Si forms $Mg_2Si$ in the presence of Mg, and improves the post-braze strength. However, when Si is in an amount of less than 0.6 mass %, the effect of improving the post-braze strength is small. When Si is in an amount of more than 1.0 mass %, the solidus temperature of the core material 2 is reduced, so that the core material 2 is melted during brazing. Therefore, the amount of Si to be contained in the core material 2 is set within the foregoing range.

(Cu: 0.6 to 1.0 Mass %)

Cu improves the post-braze strength by being incorporated in solid solution. However, when Cu is in an amount of less than 0.6 mass %, the effect of improving the post-braze strength is small. When Cu is in an amount of more than 1.0 mass %, the solidus temperature of the core material 2 is reduced, so that the core material 2 is melted during brazing. Therefore, the amount of Cu to be contained in the core material 2 is set within the foregoing range.

(Mn: 0.7 to 1.8 Mass %)

Mn forms Al—Mn—Si-Based Dispersed Particles in the presence of Si, and improves the post-braze strength by dispersion strengthening. However, when Mn is in an amount of less than 0.7 mass %, the effect of improving the post-braze strength is small. Whereas, when Mn is in an amount of more than 1.8 mass %, the amount of coarse intermetallic compounds formed during casting increases, resulting in reduction of the formability. Then, when bending necessary as a side support member is performed, cracks may occur with the coarse intermetallic compounds as starting points. Therefore, the amount of Mn to be contained in the core material 2 is set within the foregoing range.

(Mg: 0.1 to 0.7 Mass %)

Mg forms $Mg_2Si$ in the presence of Si, and improves the post-braze strength. However, when Mg is in an amount of less than 0.1 mass %, the effect of improving the post-braze strength is small. Whereas, when Mg is in an amount of more than 0.7 mass %, the amount of Mg reaching the inside of the flux during braze heating increases. Accordingly, the function of the flux is deteriorated, resulting in reduction of the brazability. Therefore, the amount of Mg to be contained in the core material 2 is set within the foregoing range.

(Ti: 0.06 to 0.20 Mass %)

Ti forms a Ti—Al-based compound in an Al alloy, and is dispersed in layers. The Ti—Al-based compound has a noble potential. For this reason, the corrosion form becomes lamellar, and hence becomes less likely to develop into corrosion in the thickness direction (pitting corrosion), resulting in an improvement of the corrosion resistance. However, when Ti is in an amount of less than 0.06 mass %, the corrosion form does not become lamellar. Accordingly, the effect of improving the corrosion resistance is small. Whereas, when Ti is in an amount of more than 0.20 mass %, coarse intermetallic compounds are formed, resulting in reduction of the formability. Then, when bending necessary as a side support member is performed, cracks may occur with the coarse intermetallic compounds as starting points, resulting in reduction of bendability. Therefore, the amount of Ti to be contained in the core material 2 is set within the foregoing range.

(Cr: 0.02 to 0.25 Mass %)

Cr forms Al—Cr-based dispersed particles and improves the post-braze strength by dispersion strengthening. However, when Cr is in an amount of less than 0.02 mass %, the effect of improving the post-braze strength is small. Whereas, when Cr is in an amount of more than 0.25 mass %, the amount of coarse intermetallic compounds formed during casting increases, which may reduce the formability. Then, when bending necessary as a side support member is performed, cracks may occur with the coarse intermetallic compounds as starting points. This may reduce the bendability. Therefore, the amount of Cr to be contained in the core material 2 is set within the foregoing range.

(Zr: 0.02 to 0.25 Mass %)

Zr forms Al—Zr-based dispersed particles and improves the post-braze strength by dispersion strengthening. However, when Zr is in an amount of less than 0.02 mass %, the effect of improving the post-braze strength is small. Whereas, when Zr is in an amount of more than 0.25 mass %, the amount of coarse intermetallic compounds formed during casting increases, which may reduce the formability. Then, when bending necessary as a side support member is performed, cracks may occur with the coarse intermetallic compounds as starting points. This may reduce the bendability. Therefore, the amount of Zr to be contained in the core material 2 is set within the foregoing range.

(Inevitable Impurities of Core Material)

Incidentally, as the inevitable impurities contained in the core material 2, mention may be made of Fe, B, Cr, and the like. So long as Fe is in an amount of 0.3 mass or less, and other elements are each in an amount of 0.1 mass % or less, and in a total amount of 0.8 mass % or less, the elements included in the core material 2 does not impair the effects of the present invention. Thus, the elements in the respective amounts can be regarded as inevitable impurities.

(Manufacturing Method of Core Material)

The manufacturing method of the core material 2 has no particular restriction. The core material 2 can be manufactured in the following manner. For example, using the alloy, an aluminum alloy for core material is made into ingot, and is cast at a prescribed casting temperature. Then, the ingot is subjected to a homogenization heat treatment at a prescribed temperature for a prescribed time.

(Brazing Material)

The brazing material 3 includes an aluminum alloy containing Si: 3.0 to 12.0 mass %. When Si contained in the brazing material 3 is in an amount of less than 3.0 mass %, the liquid phase ratio upon brazing filler metal melting is insufficient. Accordingly, sufficient brazability cannot be obtained. Whereas, when Si is in an amount of more than 12.0 mass %, coarse Si primary crystal is generated during casting of the brazing material 3. For this reason, cracks may occur during bending of the side support member, resulting in reduction of the bendability.

(Inevitable Impurities of Brazing Material)

Incidentally, as the inevitable impurities contained in the brazing material 3, mention may be made of Fe, B, and the like. So long as Fe is in an amount of 0.3 mass % or less, and other elements are each in an amount of 0.1 mass % or less, and in a total amount of 0.8 mass % or less, the elements included in the brazing material 3 does not impair the effects of the present invention. Thus, the elements in the respective amounts can be regarded as inevitable impurities.

(Manufacturing Method of Brazing Material)

The manufacturing method of the brazing material 3 has no particular restriction. The brazing material 3 can be manufactured in the following manner. For example, using the alloy, an aluminum alloy for brazing material is made into ingot, and is cast at a prescribed casting temperature. Then, the ingot is subjected to a homogenization heat treatment at a prescribed temperature for a prescribed time.

(Aluminum Alloy Brazing Sheet)

The brazing sheet 1 in accordance with Embodiment is, as described above, a sheet of a two-layered structure in which on one side of the core material 2, the brazing material 3 is disposed. Herein, the gage of the brazing sheet 1 is set at 0.6 to 1.4 mm. When the gage is less than 0.6 mm, the rigidity and strength are insufficient. Accordingly, buckling becomes more likely to occur. Whereas, when the gage is more than 1.4 mm, the weight of the brazing sheet 1 for use in a heat exchanger increases. Accordingly, buckling becomes more likely to occur. Incidentally, the gage of the brazing sheet 1 is more preferably set at 0.7 to 1.1 mm from the viewpoint of gauge down.

(Area Ratio of {001} Plane in Core Material Surface being 0.3 or More)

In the brazing sheet 1 in which the brazing material 3 is cladded on the core material 2, the area ratio of the {001} plane 10 in the core material 2 surface is set at 0.3 or more. Namely, by setting the area ratio of the {001} plane 10 in the core material 2 surface at 0.3 or more, it is possible to increase the surface energy of the core material 2, and to reduce the contact angle θ of the brazing material 3 to the core material 2. Accordingly, it is possible to improve the wettability and the brazability of the brazing filler metal.

On the other hand, when the area ratio of the {001} plane 10 in the core material 2 surface is less than 0.3, the surface energy of the core material 2 is reduced. In addition, the area ratio of other planes with a small surface energy relatively increases. Therefore, the contact angle θ of the brazing material 3 to the core material 2 increases, which inhibits the wettability. This results in reduction of the brazability. Incidentally, a specific control method of the area ratio of the {001} plane 10 will be described later.

(Measurement Method of Area Ratio of {001} Plane)

The measurement of the area ratio of the {001} plane 10 in the core material 2 surface is preferably performed with a SEM-EBSP method using a FE-SEM (Field Emission-Scanning Electron Microscope) equipped with an EBSP (Electron Back Scatter diffraction Pattern) detector.

Herein, the EBSP is Kikuchi pattern (Kikuchi lines) obtained from reflected electrons generated upon incidence of an electron beam on one surface of a specimen. By analyzing the pattern, it is possible to determine the crystal orientation of the electron beam incidence position. Further, the Kikuchi pattern denotes a pattern appearing behind an electron diffraction image in a pair of white and black parallel lines, in a band, or in an array upon scattering and diffraction of electron beams hit on a crystal.

As the FE-SEM equipped with an EBSP detector for use in the measurement, for example, a "Field-emission type scanning electron microscope JSM-6500F manufactured by JEOL Ltd." can be used. Further, the measurement site of the area ratio of the {001} plane 10 is set at a site 40 to 90 μm advancing in the gage (inside) direction from the outermost surface of the core material 2. Buffing and electropolishing are performed to the measurement site. Thus, the planes with a difference in orientation within 15 degrees from the Cube orientation ({001} <100>: rolling direction), and the rotated Cube orientation ({001} <110>: orientation resulted from face rotation of the Cube orientation) of the crystal lattice planes can be measured as the area ratio of the {001} plane 10.

(Manufacturing Method of Aluminum Alloy Brazing Sheet)

The brazing sheet 1 in accordance with Embodiment can be manufactured by combining the core material 2 and the brazing material 3 manufactured with the foregoing manufacturing method. Namely, on one side of the core material 2, the brazing material 3 is stacked. The laminate is subjected to hot rolling so as to achieve a prescribed gage, and to cold rolling and finish annealing. Incidentally, intermediate annealing may be performed during cold rolling. Alternatively, the core material 2 and the brazing material 3 are previously formed with thin sheets. Thus, only cold rolling may be performed without performing hot rolling. Herein, in order to control the area ratio of the {001} plane 10 in the core material 2 surface at 0.3 or more, it is necessary to optimize the composition of the core material 2, and to control the finish cold rolling ratio and the finish annealing conditions during manufacturing of the brazing sheet 1.

(Finish Cold Rolling Ratio and Finish Annealing Conditions)

In the brazing sheet 1 in accordance with Embodiment, in order to set the area ratio of the {001} plane 10 in the core material 2 surface at 0.3 or more, the following is required: during the manufacturing step of the brazing sheet 1, the finish cold rolling ratio during cold rolling is set at 30 to 85%, finish annealing is performed at a temperature of 300 to 450° C. for 2 hours or more, and the temperature rising rate at 200° C. or more is set at 50° C./min or less. This is considered to be due to the following: in the process in which the material which has undergone cold working during finish annealing grows with the crystal orientations rearranged while recrystallizing, the {001} plane 10 grows in a given ratio, resulting in an increase in area ratio.

(Finish Cold Rolling Ratio: 30 to 85%)

The finish cold rolling ratio is set at 30 to 85%. As a result, with working strain due to finish cold rolling as a driving force, recrystallization such that the {001} plane is in parallel with the rolling surface is promoted, resulting in an increase in area ratio of the {001} plane 10.

On the other hand, when the finish cold rolling ratio is less than 30%, the strain concentrated portions serving as nuclei for recrystallization during finish annealing are ununiformly dispersed. For this reason, when the crystal orientations are rearranged, other orientations than the {001} plane 10 also becomes more likely to grow together. As a result, the area ratio of the {001} plane 10 does not increase. Whereas, when the finish cold rolling ratio exceeds 85%, the working strain is large, resulting in an increase in number of sites in which recrystallization occurs. Therefore, various orientation planes develop as recrystallization planes, resulting in an increase in variation in crystal orientation. Thus, the area ratio of the {001} plane 10 does not increase. Therefore, by setting the finish cold rolling ratio within the foregoing range, it is possible to set the area ratio of the {001} plane 10 at 0.3 or more. Incidentally, the preferable range of the finish cold rolling ratio is 45 to 83%.

(Finish Annealing at a Temperature of 300 to 450° C. for 2 Hours or More)

Setting of the temperature of the finish annealing at 300 to 450° C. causes recrystallization such that the {001} plane 10 in the core material 2 is in parallel with the rolling surface. This results in an increase in area ratio of the {001} plane 10.

On the other hand, when the temperature of finish annealing is less than 300° C., there does not occur recrystallization such that the {001} plane 10 in the core material 2 is in parallel with the rolling surface.

Accordingly, the area ratio of the {001} plane 10 does not increase. Whereas, when the temperature of finish annealing exceeds 450° C., recrystallization of other planes than the {001} plane 10 occurs. Accordingly, the area ratio of the {001} plane 10 does not increase. Therefore, by setting the temperature of the finish annealing within the foregoing range, it is possible to set the area ratio of the {001} plane 10 at 0.3 or more.

(Finish Annealing Temperature Rising Rate: Temperature Rising Rate at 200° C. or More being 50° C./Min or Less)

The temperature rising rate at 200° C. or more in finish annealing is set at 50° C./min or less. This causes recrystallization such that the {001} plane 10 in the core material 2 is in parallel with the rolling surface, resulting in an increase in area ratio of the {001} plane 10.

On the other hand, when the temperature rising rate at 200° C. or more is more than 50° C./min, the number of sites in which recrystallization occurs tends to increase. This results in an increase in variation in crystal orientation, so that the area ratio of the {001} plane 10 does not increase. Therefore, by setting the finish annealing temperature rising rate within the foregoing range, it is possible to set the area ratio of the {001} plane 10 at 0.3 or more.

Incidentally, if required, intermediate annealing may be carried out during cold rolling. The conditions for the step may be the following: annealing at 300 to 450° C. for 2 to 10 hours; or annealing by 350- to 540-° C. CAL.

EXAMPLES

Then, the aluminum alloy brazing sheet in accordance with the present invention will be described specifically by comparison between Examples satisfying the requirements of the present invention and Comparative Examples not satisfying the requirements of the present invention.

(Manufacturing of Core Material)

The aluminum alloys for core material of S1 to S15 and S21 to S30 having the compositions indicated in Table 1 were made into ingots. The resulting ingots were cast at a casting temperature of 700° C., followed by a homogenization heat treatment at 550° C. for 10 hours. Cooling to 500° C. was performed at 0.5° C./min, and then hot rolling was performed, resulting in sheets for core material. Incidentally, the core material signs S31 to S33 are intended for related-art core materials.

TABLE 1

Composition of core material
(mass %, balance: Al and other inevitable impurities)

| Sign | Si | Cu | Mn | Mg | Ti | Cr | Zr | Fe | Note |
|---|---|---|---|---|---|---|---|---|---|
| S1 | 0.65 | 0.88 | 1.70 | 0.41 | 0.18 | — | — | 0.12 | Example |
| S2 | 0.70 | 0.66 | 1.70 | 0.20 | 0.08 | — | — | 0.05 | Example |
| S3 | 0.91 | 0.80 | 1.20 | 0.32 | 0.09 | — | — | 0.25 | Example |
| S4 | 0.82 | 0.93 | 0.90 | 0.24 | 0.13 | — | — | 0.20 | Example |
| S5 | 0.70 | 0.88 | 1.30 | 0.21 | 0.17 | 0.18 | — | 0.11 | Example |
| S6 | 0.75 | 0.96 | 1.40 | 0.33 | 0.09 | — | 0.17 | 0.14 | Example |
| S7 | 0.69 | 0.89 | 1.10 | 0.18 | 0.16 | 0.14 | 0.12 | 0.10 | Example |
| S8 | 0.62 | 0.87 | 1.00 | 0.24 | 0.11 | — | — | 0.07 | Example |
| S9 | 0.96 | 0.84 | 1.60 | 0.62 | 0.16 | — | — | 0.09 | Example |
| S10 | 0.78 | 0.62 | 1.60 | 0.14 | 0.15 | — | — | 0.16 | Example |
| S11 | 0.89 | 0.95 | 1.20 | 0.38 | 0.12 | — | — | 0.06 | Example |
| S12 | 0.71 | 0.69 | 0.80 | 0.45 | 0.09 | — | — | 0.13 | Example |
| S13 | 0.89 | 0.77 | 1.70 | 0.53 | 0.17 | — | — | 0.22 | Example |
| S14 | 0.93 | 0.81 | 1.50 | 0.12 | 0.12 | — | — | 0.19 | Example |
| S15 | 0.74 | 0.74 | 1.20 | 0.68 | 0.15 | — | — | 0.14 | Example |
| S21 | 0.54 | 0.63 | 1.20 | 0.38 | 0.10 | — | — | 0.12 | Comparative example(less than lower limit for Si) |
| S22 | 1.12 | 0.79 | 0.80 | 0.18 | 0.17 | — | — | 0.05 | Comparative example(more than upper limit for Si) |
| S23 | 0.69 | 0.56 | 1.40 | 0.56 | 0.08 | — | — | 0.25 | Comparative example(less than lower limit for Cu) |
| S24 | 0.94 | 1.18 | 0.90 | 0.27 | 0.13 | — | — | 0.20 | Comparative example(more than upper limit for Cu) |
| S25 | 0.75 | 0.84 | 0.60 | 0.62 | 0.11 | — | — | 0.13 | Comparative example(less than lower limit for Mn) |
| S26 | 0.89 | 0.95 | 2.10 | 0.32 | 0.16 | — | — | 0.10 | Comparative example(more than upper limit for Mn) |
| S27 | 0.82 | 0.92 | 1.70 | 0.08 | 0.17 | — | — | 0.07 | Comparative example(less than lower limit for Mg) |
| S28 | 0.97 | 0.88 | 1.60 | 0.73 | 0.15 | — | — | 0.11 | Comparative example(more than upper limit for Mg) |
| S29 | 0.68 | 0.72 | 1.00 | 0.12 | 0.05 | — | — | 0.23 | Comparative example(less than lower limit for Ti) |
| S30 | 0.77 | 0.68 | 1.10 | 0.60 | 0.23 | — | — | 0.13 | Comparative example(more than upper limit for Ti) |
| S31 | 0.95 | 0.76 | 1.40 | 0.15 | 0.05 | — | — | 0.07 | Comparative example (Related art) |
| S32 | 1.20 | 0.54 | 1.35 | 0.11 | 0.04 | — | — | 0.06 | Comparative example (Related art) |
| S33 | 0.85 | 0.93 | 1.66 | 0.17 | 0.05 | — | — | 0.06 | Comparative example (Related art) |

(Manufacturing of Brazing Material)

The aluminum alloys for brazing material of R1 to R5 having the compositions indicated in Table 2 were made into ingots. The resulting ingots were cast at a casting temperature of 700° C., followed by a homogenization heat treatment at 550° C. for 10 hours. Cooling to 500° C. was performed at 0.5° C./min, and then hot rolling was performed, resulting in sheets for brazing material.

TABLE 2

| Sign | Composition of brazing material | Note |
|---|---|---|
| R1 | Al - 10.0 mass % Si | Example |
| R2 | Al - 8.0 mass % Si | Example |
| R3 | Al - 3.5 mass % Si | Example |
| R4 | Al - 2.5 mass % Si | Comparative example |
| R5 | Al - 13.0 mass % Si | Comparative example |

(Manufacturing of Brazing Sheet)

On respective one sides of the sheets for core material of S1 to S15, and S21 to S30 manufactured, the sheets for brazing material of R1 to R5 were stacked. Thus, hot rolling was performed at 400° C., and finish cold rolling was performed at each finish cold rolling ratio indicated in the condition column of Table 3 so as to achieve each gage indicated in the same column. Further, the cladding ratio of the brazing material was set at 10%. Then, at the finish annealing temperature rising rate indicated in the condition column of Table 3, finish annealing was performed at 400° C.×3 hours, resulting in brazing sheets of Nos. 1 to 20 and Nos. 31 to 50. Herein, out of the manufactured brazing sheets, Nos. 51 to 53 are intended to be brazing sheets using related-art core materials.

TABLE 3

| | | | Conditions | | Evaluation | | | | | |
|---|---|---|---|---|---|---|---|---|---|---|
| No. | Brazing material | Core material | Gage [mm] | Finish cold rolling ratio [%] | Finish annealing temperature rising rate [° C./min] | {001} plane area ratio | Post-braze strength | Post-braze buckling load | Bendability | Corrosion resistance | Brazability | Note |
| 1 | R1 | S1 | 0.8 | 70 | 5 | 0.4 | AAAA | AA | AA | AA | AA | Example |
| 2 | R1 | S2 | 0.8 | 70 | 5 | 0.37 | AA | AA | AA | AA | AAAA | Example |
| 3 | R1 | S3 | 0.8 | 70 | 5 | 0.39 | AAAA | AA | AA | AA | AA | Example |
| 4 | R1 | S4 | 0.6 | 80 | 5 | 0.33 | AAAA | AA | AA | AA | AA | Example |
| 5 | R1 | S5 | 0.7 | 80 | 5 | 0.34 | AAAA | AA | AA | AA | AA | Example |
| 6 | R1 | S6 | 1.4 | 35 | 5 | 0.33 | AAAA | AAAA | AA | AA | AA | Example |
| 7 | R1 | S6 | 1.1 | 45 | 5 | 0.35 | AAAA | AAAA | AA | AA | AA | Example |
| 8 | R1 | S7 | 0.8 | 35 | 5 | 0.33 | AA | AA | AA | AA | AA | Example |
| 9 | R1 | S7 | 0.8 | 70 | 5 | 0.41 | AA | AA | AA | AA | AAAA | Example |
| 10 | R1 | S7 | 0.8 | 80 | 5 | 0.36 | AA | AA | AA | AA | AAAA | Example |
| 11 | R1 | S8 | 0.9 | 65 | 5 | 0.4 | AAAA | AA | AA | AA | AA | Example |
| 12 | R1 | S9 | 0.9 | 65 | 5 | 0.39 | AAAA | AA | AA | AA | AA | Example |
| 13 | R1 | S10 | 1 | 60 | 5 | 0.38 | AA | AAAA | AA | AA | AAAA | Example |
| 14 | R1 | S11 | 1 | 60 | 5 | 0.38 | AAAA | AAAA | AA | AA | AA | Example |
| 15 | R1 | S12 | 1 | 75 | 5 | 0.34 | AAAA | AAAA | AA | AA | AA | Example |
| 16 | R1 | S13 | 1 | 75 | 5 | 0.34 | AAAA | AAAA | AA | AA | AA | Example |
| 17 | R1 | S14 | 1.3 | 60 | 5 | 0.33 | AA | AAAA | AA | AA | AAAA | Example |
| 18 | R1 | S15 | 1.3 | 60 | 5 | 0.33 | AAAA | AAAA | AA | AA | AA | Example |
| 19 | R2 | S1 | 0.8 | 70 | 5 | 0.42 | AAAA | AA | AA | AA | AA | Example |
| 20 | R3 | S1 | 0.8 | 70 | 5 | 0.41 | AAAA | AA | AA | AA | AA | Example |
| 31 | R1 | S1 | 0.8 | 88 | 5 | 0.27 | AAAA | AA | AA | AA | CC | Comparative example |
| 32 | R1 | S2 | 0.8 | 88 | 5 | 0.25 | AA | AA | AA | AA | CC | Comparative example |
| 33 | R1 | S3 | 0.8 | 25 | 5 | 0.24 | AAAA | AA | AA | AA | CC | Comparative example |
| 34 | R1 | S4 | 0.8 | 25 | 5 | 0.26 | AAAA | AA | AA | AA | CC | Comparative example |
| 35 | R1 | S5 | 0.5 | 75 | 5 | 0.36 | AAAA | CC | AA | AA | AA | Comparative example |
| 36 | R1 | S6 | 0.5 | 75 | 5 | 0.35 | AAAA | CC | AA | AA | AA | Comparative example |
| 37 | R1 | S21 | 0.8 | 70 | 5 | 0.37 | CC | AA | AA | AA | AA | Comparative example |
| 38 | R1 | S22 | 0.8 | 70 | 5 | 0.38 | Unevaluated due to melting during brazing | | | | | Comparative example |
| 39 | R1 | S23 | 0.8 | 70 | 5 | 0.38 | CC | AA | AA | AA | AA | Comparative example |
| 40 | R1 | S24 | 0.8 | 70 | 5 | 0.39 | Unevaluated due to melting during brazing | | | | | Comparative example |
| 41 | R1 | S25 | 0.8 | 70 | 5 | 0.37 | CC | AA | AA | AA | AA | Comparative example |
| 42 | R1 | S26 | 0.8 | 70 | 5 | 0.38 | AAAA | AA | CC | AA | AA | Comparative example |
| 43 | R1 | S27 | 0.8 | 70 | 5 | 0.37 | CC | AA | AA | AA | AA | Comparative example |
| 44 | R1 | S28 | 0.8 | 70 | 5 | 0.39 | AAAA | AA | AA | AA | CC | Comparative example |
| 45 | R1 | S29 | 0.8 | 70 | 5 | 0.39 | AA | AA | AA | CC | AAAA | Comparative example |
| 46 | R1 | S30 | 0.8 | 70 | 5 | 0.38 | AAAA | AA | CC | AA | AA | Comparative example |
| 47 | R4 | S1 | 0.8 | 70 | 5 | 0.37 | AAAA | AA | AA | AA | CC | Comparative example |

TABLE 3-continued

| | | | Conditions | | | Evaluation | | | | | |
|---|---|---|---|---|---|---|---|---|---|---|---|
| | | | | Finish | | | | | | | |
| | | | Finish | annealing | | | | | | | |
| | | | cold | temperature | {001} | | Post-braze | | | | |
| | Brazing | Core | Gage | rolling | rising rate | plane area | Post-braze | buckling | | Corrosion | | |
| No. | material | material | [mm] | ratio [%] | [° C./min] | ratio | strength | load | Bendability | resistance | Brazability | Note |
| 48 | R5 | S2 | 0.8 | 70 | 5 | 0.38 | AA | AA | CC | AA | AAAA | Comparative example |
| 49 | R1 | S1 | 0 8 | 70 | 60 | 0.23 | AAAA | AA | AA | AA | CC | Comparative example |
| 50 | R1 | S2 | 0.8 | 70 | 60 | 0.22 | AAAA | AA | AA | AA | CC | Comparative example |
| 51 | R1 | S31 | 0.8 | 70 | 60 | 0.22 | AA | AA | AA | AA | CC | Comparative example |
| 52 | R1 | S32 | 0.8 | 25 | 5 | 0.21 | AA | AA | AA | AA | CC | Comparative example |
| 53 | R1 | S33 | 0.8 | 88 | 5 | 0.24 | AA | AA | AA | AA | CC | Comparative example |

Then, the aluminum alloy brazing sheets manufactured as described above were used as test specimens. The area ratio of the {001} plane in the core material surface of each test specimen, post-braze strength, post-braze buckling load, bendability, corrosion resistance, and brazability were measured and evaluated with the following methods. The results are indicated in the evaluation column of Table 3. Incidentally, in the present embodiment, the specimens evaluated as good in all the evaluation items were referred to as Examples satisfying the requirements of the present invention. Whereas, the specimens evaluated as bad in even one of the evaluation items were referred to as Comparative Examples not satisfying the requirements of the present invention.

(Measurement of Area Ratio of {001} Plane)

The measurement of the area ratio of the {001} plane in the core material surface was performed by means of the SEM-EBSP method. As the measurement device, "Field-emission type scanning electron microscope JSM-6500F manufactured by JEOL Ltd." was used. Then, buffing and electropolishing were performed to a site 60 μm advancing in the gage (inside) direction from the outermost surface of the core material. Thus, the planes with a difference in orientation within 15 degrees from the Cube orientation ({001} <100>), and the rotated Cube orientation ({001}<110>) was measured as the area ratio of the {001} plane 10.

(Evaluation of Post-Braze Strength)

The post-braze strength was measured in the following manner. Each test specimen was subjected to a heat treatment under the conditions simulating those for brazing at 600° C.×3 minutes, and then, was held at room temperature for 7 days. Thus, the test specimen was processed into a JIS No. 5 specimen so that the tensile direction and the rolling direction are in parallel with each other. Then, a tensile test was carried out at room temperature. Then, a specimen with a tensile strength of 170 MPa or more was evaluated as best "AAAA"; a specimen with a tensile strength of 160 MPa or more and less than 170 MPa was evaluated as good "AA"; and a specimen with a tensile strength of less than 160 MPa was evaluated as bad "CC".

(Evaluation of Post-Braze Buckling Load)

The post-braze buckling load was measured by means of a compression tester in the following manner. Each test specimen was subjected to a heat treatment under the conditions simulating those for brazing at 600° C.×3 minutes, and then, was held at room temperature for 7 days. Thus, the test specimen was processed to a length of 100 mm×a width of 15 mm with the gage unchanged. Then, a specimen with a buckling load of 100 MPa or more was evaluated as best "AAAA"; a specimen with a buckling load of 50 MPa or more and less than 100 MPa was evaluated as good "AA"; and a specimen with a buckling load of less than 50 MPa was evaluated as bad "CC".

(Evaluation of Bendability)

For the bendability, a test specimen was subjected to a 1.0-R 90-degree bending test. After the test, the R part was observed by an optical microscope. Then, the case where there was no microcrack with a crack length of 20 μm or more was evaluated as good "AA". Whereas, the case where there were microcracks was evaluated as bad "CC".

(Evaluation of Corrosion Resistance)

The corrosion resistance was evaluated in the following manner. Each test specimen was subjected to a heat treatment under the conditions simulating those for brazing at 600° C.×3 minutes. Then, with the core material side as the test side, a 7-day SWAAT test (acidified synthetic seawater spray test: cycle test of spraying and wetting) was carried out to measure the corrosion depth. Then, a specimen with a corrosion depth of less than 200 μm was evaluated as good "AA", and a specimen with a corrosion depth of 200 μM or more was evaluated as bad "CC".

(Evaluation of Brazability)

The brazability was evaluated with the evaluation method described on pages 132 to 136 of "ALUMINUM BRAZING HANDBOOK revised edition (TADASHI TAKEMOTO et al., Japan Light Metal Welding & Construction Association, issued on March, 2003)". Namely, between a horizontally placed bottom sheet (test specimen (longitudinal width 25 mm×transverse width 60 mm)) and a top sheet (4045Al/3003Al alloy sheet 1.0 t (longitudinal width 25 mm×transverse width 60 mm)) disposed in a perpendicularly rising state to the bottom sheet, a given clearance was set with a 2-mm-dia spacer made of stainless steel interposed therebetween. Further, the cladding ratio of the brazing material was set at 10%. Thus, on the brazing material surface side of the bottom sheet test specimen, a flux (FL-7 manufactured by MORITA CHEMICAL INDUSTRIES Co., Ltd.) was applied at 10 g/m². Then, a specimen with a clearance filling length of 20 mm or more was evaluated as best "AAAA"; a specimen with a clearance filling length of 15 mm or more and less than 20 mm was evaluated as good "AA"; and a specimen with a clearance filling length of less than 15 mm was evaluated as bad "CC".

As indicated in Table 3, the test specimens of Nos. 1 to 20 satisfy the requirements of the present invention. Therefore, the test specimens showed good results in all the items of the area ratio of the {001} plane in the core material surface of the test specimen, post-braze strength, post-braze buckling load, bendability, corrosion resistance, and brazability. On the other hand, the test specimens of Nos. 31 to 50 do not satisfy the requirements specified in the present invention. Therefore, the test specimens showed bad results in any of the area ratio of the {001} plane in the core material surface of the test specimen, post-braze strength, post-braze buckling load, bendability, corrosion resistance, and brazability.

Specifically, for the test specimens of Nos. 31 and 32, the finish cold rolling ratio was more than 85%. Accordingly, the area ratio of the {001} plane in the core material surface was less than 0.3, resulting in bad brazability. Whereas, for the test specimens of Nos. 33 and 34, the finish cold rolling ratio was less than 30%. Accordingly, the area ratio of the {001} plane in the core material surface was less than 0.3, resulting in bad brazability. Whereas, for the test specimens of Nos. 35 and 36, the gage was less than 0.6 mm. Accordingly, the rigidity and the strength were insufficient, resulting in low post-braze buckling load.

For the test specimen of No. 37, Si in the core material was in an amount of less than 0.6 mass %. Accordingly, the post-braze strength was low. Whereas, for the test specimen of No. 38, Si in the core material was in an amount of more than 1.0 mass %. Accordingly, the core material melted during brazing, so that evaluation could not be performed.

For the test specimen of No. 39, Cu in the core material was in an amount of less than 0.6 mass %. Accordingly, the post-braze strength was low. Whereas, for the test specimen of No. 40, Cu in the core material was in an amount of more than 1.0 mass %. Accordingly, the core material melted during brazing, so that evaluation could not be performed.

For the test specimen of No. 41, Mn in the core material was in an amount of less than 0.7 mass %. Accordingly, the post-braze strength was low. Whereas, for the test specimen of No. 42, Mn in the core material was in an amount of more than 1.8 mass %. Accordingly, the bendability was low.

For the test specimen of No. 43, Mg in the core material was in an amount of less than 0.2 mass %. Accordingly, the post-braze strength was low. Whereas, for the test specimen of No. 44, Mg in the core material was in an amount of more than 0.7 mass %. Accordingly, the brazability was low.

For the test specimen of No. 45, Ti in the core material was in an amount of less than 0.06 mass %. Accordingly, the corrosion resistance was low. Whereas, for the test specimen of No. 46, Ti in the core material was in an amount of more than 0.20 mass %. Accordingly, the bendability was low.

For the test specimen of No. 47, Si in the brazing filler metal was in an amount of less than 0.3 mass %. Accordingly, the brazability was bad. Whereas, for the test specimen of No. 48, Si in the brazing filler metal was in an amount of more than 12.0 mass %. Accordingly, the bendability was low.

For the test specimens of Nos. 49 and 50, the temperature rising rate of finish annealing was more than 50° C./min. Accordingly, the area ratio of the {001} plane in the core material surface was less than 0.3, resulting in bad brazability.

For the test specimen of No. 51, the temperature rising rate of finish annealing was more than 50° C./min. Accordingly, the area ratio of the {001} plane in the core material surface was less than 0.3, resulting in bad brazability. Whereas, for the specimen of No. 52, the finish cold rolling ratio was less than 30%. Accordingly, the area ratio of the {001} plane in the core material surface was less than 0.3, resulting in bad brazability. Further, for the test specimen of No. 53, the finish cold rolling ratio was more than 85%. Accordingly, the area ratio of the {001} plane in the core material surface was less than 0.3, resulting in bad brazability.

Up to this point, the aluminum alloy brazing sheet in accordance with the present invention was specifically described by way of best mode for carrying out the invention and examples. However, the gist of the present invention is not limited to the description, and should be broadly construed based on the description of the appended claims. Further, it is naturally understood that a variety of changes, modifications, and the like based on the description are also included in the gist of the present invention.

What is claimed is:

1. An aluminum alloy brazing sheet of a two-layered structure, comprising: a core material; and a brazing material provided on one side of the core material,
   the core material comprising Si: 0.6 to 1.0 mass %, Cu: 0.6 to 1.0 mass %, Mn: 0.7 to 1.8 mass %, Mg: 0.1 to 0.7 mass %, and Ti: 0.06 to 0.20 mass %, and the balance including Al and inevitable impurities,
   the brazing material comprising an aluminum alloy comprising Si: 3.0 to 12.0 mass %,
   the gage of the aluminum alloy brazing sheet being 0.6 to 1.4 mm, and
   the area ratio of a (001) plane in the core material surface being 0.3 or more.

2. The aluminum alloy brazing sheet according to claim 1, wherein the core material further comprises at least one of Cr: 0.02 to 0.25 mass % and Zr: 0.02 to 0.25 mass %.

3. The aluminum alloy brazing sheet according to claim 1, wherein the core material comprises Si: 0.65 to 0.97 mass %.

4. The aluminum alloy brazing sheet according to claim 1, wherein the core material comprises Si: 0.70 to 0.93 mass %.

5. The aluminum alloy brazing sheet according to claim 1, wherein the core material comprises Cu: 0.62 to 0.96 mass %.

6. The aluminum alloy brazing sheet according to claim 1, wherein the core material comprises Cu: 0.70 to 0.89 mass %.

7. The aluminum alloy brazing sheet according to claim 1, wherein the core material comprises Mn: 0.9 to 1.70 mass %.

8. The aluminum alloy brazing sheet according to claim 1, wherein the core material comprises Mn: 1.0 to 1.60 mass %.

9. The aluminum alloy brazing sheet according to claim 1, wherein the core material comprises Mg: 0.12 to 0.68 mass %.

10. The aluminum alloy brazing sheet according to claim 1, wherein the core material comprises Mg: 0.21 to 0.45 mass %.

11. The aluminum alloy brazing sheet according to claim 1, wherein the core material comprises Ti: 0.08 to 0.17 mass %.

12. The aluminum alloy brazing sheet according to claim 1, wherein the core material comprises Ti: 0.12 to 0.16 mass %.

13. The aluminum alloy brazing sheet according to claim 1, wherein the gage of the aluminum alloy brazing sheet is 0.7 to 1.1.

14. The aluminum alloy brazing sheet according to claim 1, wherein the brazing material comprises Si: 3.5 to 10 mass %.

15. The aluminum alloy brazing sheet according to claim 1, wherein the brazing material comprises Si: 3.5 to 8 mass %.

* * * * *